(12) United States Patent
Dianov et al.

(10) Patent No.: US 8,509,588 B2
(45) Date of Patent: Aug. 13, 2013

(54) AMPLIFYING OPTICAL FIBER OPERATING AT A WAVELENGTH IN THE RANGE OF 1000-1700 NM, METHODS OF FABRICATING THE SAME, AND FIBER LASER

(75) Inventors: Evgeny Mikhailovich Dianov, Moscow (RU); Vladislav Vladimirovich Dvoirin, Moscow (RU); Valery Mikhailovich Mashinsky, Moscow (RU); Alexei Nikolaevich Guryanov, Nizhny Novgorod (RU); Andrei Alexandrovich Umnikov, Nizhny Novgorod (RU)

(73) Assignee: Fiber Optics Research Center of The Russian Academy of Sciences, Moscow (RU)

( * ) Notice: Subject to any disclaimer, the term of this patent is extended or adjusted under 35 U.S.C. 154(b) by 1049 days.

(21) Appl. No.: 12/067,698

(22) PCT Filed: Sep. 8, 2006

(86) PCT No.: PCT/RU2006/000475
§ 371 (c)(1),
(2), (4) Date: Aug. 7, 2008

(87) PCT Pub. No.: WO2007/035131
PCT Pub. Date: Mar. 29, 2007

(65) Prior Publication Data
US 2009/0116809 A1 May 7, 2009

(30) Foreign Application Priority Data
Sep. 22, 2005 (RU) ................. 2005129648

(51) Int. Cl.
*G02B 6/02* (2006.01)
*H01S 3/30* (2006.01)
*C03C 13/04* (2006.01)
*C03C 3/06* (2006.01)
*C03C 3/083* (2006.01)
*H04B 10/12* (2006.01)

(52) U.S. Cl.
USPC ........... 385/142; 385/123; 385/126; 385/127; 359/341.31; 359/341.5; 372/6; 372/40; 372/66; 372/68; 372/69; 372/70; 372/71; 501/37; 501/54; 501/55; 501/68

(58) Field of Classification Search
USPC .................. 385/37, 123, 126, 127, 141–142; 359/333, 341.1, 341.3, 341.31, 341.5; 501/37, 501/53–55, 68; 372/6, 40–42, 66, 68–71, 372/75, 102
See application file for complete search history.

(56) References Cited

U.S. PATENT DOCUMENTS

| | | | |
|---|---|---|---|
| 5,647,038 A * | 7/1997 | Minden et al. | 385/37 |
| 6,941,053 B2 * | 9/2005 | Lauzon et al. | 385/126 |
| 7,179,802 B2 * | 2/2007 | Olson et al. | 514/211.1 |
| 7,298,768 B1 * | 11/2007 | Jiang | 372/40 |
| 2002/0041750 A1 * | 4/2002 | Chacon et al. | 385/141 |
| 2004/0114894 A1 * | 6/2004 | Andrus et al. | 385/123 |
| 2004/0142809 A1 * | 7/2004 | Pinckney | 501/10 |
| 2004/0223211 A1 * | 11/2004 | Kakui et al. | 359/341.5 |

FOREIGN PATENT DOCUMENTS

| | | |
|---|---|---|
| EP | 0438876 | 7/1991 |
| GB | 2176472 | 12/1986 |
| JP | 11029334 | 2/1999 |
| JP | 2000131530 | 5/2000 |
| JP | 2004020994 | 1/2004 |

OTHER PUBLICATIONS

G. A. Ball et al., "Design of a Single-Mode Linear-Cavity Erbium Fiber Laser Utilizing Bragg Reflectors," Journal of Lightwave Technology, vol. 10, No. 10, Oct. 1992, pp. 1338-1343.*

Yasushi Fujimoto et al., Infrared Luminescence from Bismuth-Doped Silica Glass, Jpn. J. Appl. Phys., vol. 40 (2001) pp. L279-L281.

Xian-Geng Meng et al., Infrared Broadband Emission of Bismuth-Doped Barium-Aluminum-Borate Glasses, Optics Express, vol. 13, No. 5, Mar. 7, 2005.

Xian-Geng Meng et al., Near Infrared Broadband Emission of Bismuth-Doped Aluminophosphate Glass, Optics Express, vol. 13, No. 5, Mar. 7, 2005.

Yasushi Fujimoto et al., Optical Amplification in Bismuth-Doped Silica Glass, Applied Physics Letters, vol. 82, No. 19, May 12, 2003, pp. 3325-3326.

Tingye Li, Optical Fiber Communications, vol. 1 Fiber Fabrication, 1985, Academic Press, Inc.

Michel J. F. Digonnet, Rare-Earth-Doped Fiber Lasers and Amplifiers, Marcel Dekker Inc., 2001.

Peng et al: "Investigations on bismuth and aluminum co-coped germanium oxide glasses for ultra-broadband optical amplification", Journal of Non-Crystalline Solids, North-Holland Physics Publishing, Amsterdam, NL, vol. 351, No. 30-32, Sep. 1, 2005, pp. 2388-2393, XP005044476, ISSN: 0022-3093, p. 2389, left-hand column, par. 2.

Rico-Fuentes O Et Al: "Characterization of spray deposited bismuth oxide thin films and their thermal conversion to bismuth silicate", Thin Solid Films, Elsevier-Sequoia S.A. Lausanne, CH, V. 478, No. 1-2, May 1, 2005, pp. 96-102, XP004774103, ISSN: 0040-6090, whole document.

Murata K et al: "Bi-doped SiO2 as a new laser material for an intense laser", Fusion Engineering and Design, Elsevier Science Publishers, Amsterdam, NL, vol. 44, No. 1-4, Feb. 1999, pp. 437-439, XP004161781, ISSN: 0920-3796, p. 437, right-hand column, par. 2.1.

Database Inspec [Online] Institution of Electrical Engineers, Stevenage, GB; 2004, Sotobayashi H et al: "Broadband fiber lasers using bismuth-oxide-based erbium-doped fiber amplifiers", XP002443130, Database accession No. 8859464 abstract.

International Search Report and Written Opinion of International Searching Authority, PCT/RU2006/000475, mailed Jan. 8, 2007.

\* cited by examiner

*Primary Examiner* — Uyen Chau N Le

*Assistant Examiner* — Michael Mooney

(74) *Attorney, Agent, or Firm* — Womble Carlyle

(57) ABSTRACT

An amplifying optical fiber includes a core containing oxides of elements selected from the group consisting of silicon, germanium, phosphorus, bismuth, aluminum, gallium with a concentration of bismuth oxide of 10-4-5 mol %, a total concentration of silicon and germanium oxides of 70-99.8999 mol %, a total concentration of aluminum and gallium oxides of 0.1-20 mol % wherein both aluminum and gallium oxide are present and a ratio of aluminum oxide to gallium oxide is at least two, and a concentration of phosphorus oxide from 0 to 10 mol %, and provides a maximum optical gain at least 10 times greater than the nonresonant loss factor in the optical fiber. An outside oxide glass cladding comprises fused silica. The core has an absorption band in the 1000 nm region, pumping to which region provides an increased efficiency of power conversion of pump light into luminescence light in the 1000-1700 nm range.

15 Claims, 6 Drawing Sheets

AMPLIFYING OPTICAL FIBER OPERATING AT A WAVELENGTH IN THE RANGE OF 1000-1700 NM, METHODS OF FABRICATING THE SAME, AND FIBER LASER

FIELD OF THE INVENTION

The present invention relates generally to fiber optics, and more specifically to an amplifying optical fiber operating at a wavelength in the range of 1000-1700 nm, methods of manufacturing the same and a fiber laser employing the amplifying optical fiber.

The invention is suitable for utilization in optical communication systems as broadband amplifiers and lasers operating in the fused silica transparent region of 1000-1700 nm. The invention may be used to provide tunable lasers and femtosecond fiber lasers that require a broad active material amplification band. The laser is also applicable to the fields in which spectral selective exposure of tissues to radiation is required, in particular, in medicine, as well as in material processing, environment diagnostics and chemistry.

DESCRIPTION OF THE RELATED ART

Luminescence in the near infrared region from 1000 to 1600 nm in bismuth-doped glasses, such as silicate, phosphate, germinate and borate glasses, was reported e.g. by Y. Fujimoto and M. Nakatsuka in Jpn. J. Appl. Phys., 40 (2001), p. L279. Luminescence band of the glasses has a width of more than 100 m and a lifetime of more than 100 μs, while the band spectral position depends on the glass composition.

X. Meng et al. in Optics Express, 13 (2005), p. 1635, reported that they observed two absorption peaks caused by luminescence centers at the wavelengths 465 and 700 nm in the absorption spectrum of barium-aluminum borate glasses doped with bismuth. The same authors reported in Optics Express, 13 (2005), p. 1628, that they observed two absorption peaks caused by luminescence centers at the wavelengths 460 and 700 nm in the absorption spectrum of bismuth-doped aluminum phosphate glasses, and three absorption peaks at the wavelengths 500, 700 and 800 m and a flattening at 1000 nm in the absorption spectrum of bismuth-doped aluminum germinate glasses.

Y. Fujimoto and M. Nakatsuka, Jpn. J. Appl. Phys., 40 (2001), p. L279, observed three absorption peaks caused by luminescence centers in the absorption spectrum of bismuth-doped aluminum silicate glass at the wavelengths 500, 700 and 800 nm. As stated in the article, the studied quartz and aluminum/quartz glasses exhibited luminescence only when they were doped jointly with bismuth and aluminum.

The same authors (Appl. Phys. Lett., 82 (2003), p. 3325) demonstrated amplification of a test signal at the 1300 nm wavelength in bismuth-doped aluminum silicate glass at pumping with the wavelength of 808 nm, where the gain was smaller than optical loss in the specimen in this region of spectrum.

A general drawback of the above glasses is a high level of optical loss in the luminescence region and the fact that the gain does not exceed the optical loss level, this prohibiting creation of amplifiers on their basis.

There is no way to conclude from the published data whether it is possible in principle to create amplifiers on the basis of such glasses or fibers having such composition. Increased test signal intensity at pumping may be caused by absorption saturation, so it is unusable for optical amplification.

Most closely related to the present invention is an amplifying optical fiber (e.g. JP patent JP2004020994 entitled "Glass Fiber for Optical Amplification"). Abbe value of the glass fiber core is greater than or equal to Abbe value of the cladding material, therefore better overlapping of pump mode field and signal mode field can be attained, which improves optical amplification characteristics. The fiber core preferably consists of an oxide glass containing bismuth oxide, so it is capable to provide optical amplification in the range of 950-1600 nm. Along with bismuth oxide, the fiber core contains oxides of aluminum and bivalent metals from the group of MgO, CaO, SrO, BaO, ZnO.

The patent is however silent of optical amplification in the optical fibers having such composition and whether the gain exceeds the optical loss level in the range amplified. The presence of luminescence in the glasses with such composition does not ensure the capacity to optical amplification. Therefore, the patent lacks information on the applicability in principle of the optical fibers to creation of optical amplifiers.

Concentration ranges of components of the core glass are also missing in the patent. It is known that phase separation processes start in silicate glasses at excessive amount of glass grid modifiers, which give rise to formation of significant optical heterogeneities and increased scattering loss, as the result the optical losses dominate over the gain, and excessive concentration of active centers leads to concentration quenching, so that the amplification efficiency declines to the point of disappearance.

A preferred application range mentioned in the patent is 1300-1320 nm, however the luminescence band intensity in this region, as shown in the accompanying drawing, decreases about twice, and it drops approximately by an order of magnitude in the 1600 nm region as compared to the maximum one in the 1180 nm region; this significantly impairs the amplification efficiency in these regions of spectrum and causes problems associated with enhanced spontaneous luminescence. Disadvantages also include the necessity of pumping the active fiber to a single-mode core in order to use improved optical amplification characteristics, whereas the most powerful and efficient pumping can be currently obtained by employing multimode diode radiation sources. Thus, the prior art has a restricted application field and is unsuitable for creating high power lasers and amplifiers.

A method of manufacturing an optical fiber is disclosed in Japan Patent JP 11029334. The method comprises the following steps: mixing finely dispersed zeolite with an aqueous solution of bismuth nitrite, preparing a gel and sintering the gel after dehydration thereof to obtain a silicate glass containing bismuth oxide dopant, and forming an optical fiber from the glass. The method is a modification of a sol-gel method used to produce glass.

Data on optical losses in glasses produced by the method is however missing in the patent.

As known, glass fibers manufactured by a sol-gel method suffer from relatively high optical losses as the method is incapable of purifying glass from undesired impurities to a level attainable e.g. in chemical vapor deposition methods, this being a drawback to the sol-gel method. Fabrication of high-quality optical fibers from fused silica by a sol-gel method is impossible because residual chemical agents in the glass, when heated to a high temperature required in drawing an optical fiber, form bubbles in the glass that lead to formation of defects in the optical fiber structure, impair strength of the optical fiber, entail growth of optical losses and frequently even fracture of the glass fiber. Another disadvantage is a quite complicated and long-term manufacturing process taking, as stated in the description, several weeks.

Most closely related to the present invention is a method of modified chemical vapor deposition (MCVD) of oxides forming a core and generated by the reaction between oxygen and vapors of chlorides of elements selected from the group consisting of silicon, germanium, phosphor, aluminum, gallium on an inner surface of a fused silica tube serving as a cladding, the method comprising the steps of: passing oxygen and chloride vapors of said elements through the fused silica tube at a temperature of 1700-2000° C., and subjecting the tube to subsequent compression under surface tension forces at an increased temperature of 2000-2100° C. to produce a solid rod-shaped optical fiber preform which is then drawn into an optical fiber (e.g. "Optical Fiber Communications", Vol. 1 Fiber Fabrication, edited by Tingye Li, 1985 Academic Press, Inc.).

Closely related methods include a plasma chemical vapor deposition (PCVD), its modification (SPCVD), outside vapor deposition (OVD), vapor-phase axial deposition (VAD) ("Optical Fiber Communications", Vol. 1 Fiber Fabrication, edited by Tingye Li, 1985 Academic Press, Inc.).

The listed methods however fail to disclose a process of addition of bismuth oxide to the oxide glasses.

Most closely related to a fiber laser according to the present invention are fiber lasers based on fused silica fibers containing rare-earth ions (e.g. Digonnet "Rare-Earth-Doped Fiber Lasers and Amplifiers" second edition, corrected and amended, Marcel Dekker, Inc., 2001). The disclosed lasers operate in different regions of the 1000-1700 nm range corresponding to the fused silica transparent region.

A problem with the lasers is a relatively small amplification band width in the 1000-1700 nm range due to relatively narrow luminescence bands of rare-earth ions in this spectrum region in fused silica (smaller than 100 nm), and an insignificant change of luminescence band spectral position with modification of glass composition. As the result, both the possible wavelength tuning region and the minimum pulse duration of such lasers are limited, while a significant part of fused silica transparent region remains unused.

Currently no effective lasers and broadband amplifiers are known in the range of 1200-1500 nm, that allow joining the active fiber with fused silica fibers by splicing with a low level of insertion loss.

SUMMARY OF THE INVENTION

An object of the present invention is to provide an amplifying optical fiber operating at a wavelength in the range of 1000-17000 nm, comprising a fused silica cladding, in which a predetermined percentage of component oxides, including bismuth oxide, will enable the amplification band width to be extended as compared to prior art fused silica fiber amplifiers and provide efficient amplification owing to the optical gain at least by an order of magnitude greater than the nonresonant loss factor of the optical fiber.

An object of the present invention is to provide methods for fabricating an amplifying optical fiber operating at a wavelength in the range of 1000-1700 nm, comprising modified vapor deposition methods that ensure: a predetermined percentage of component oxides, including bismuth oxide; efficiently reducing concentration of undesired impurities; to produce an optical fiber having an increased amplification band width as compared to prior art fused silica fiber amplifiers, and enable efficient amplification owing to the fact that the optical gain is at least by an order of magnitude greater than the nonresonant loss factor in the optical fiber.

An object of the present invention is to provide a fiber laser for generating light at a wavelength in the range of 1000-1700 nm, wherein the use of an amplifying optical fiber operating at a wavelength in the range of 1000-1700 nm and having a predetermined percentage of components will allow the laser wavelength tuning range to be extended as compared to prior art lasers based on quartz fibers doped with rare-earth ions, and the active fiber to be connected to fused silica fibers by splicing at a low optical insertion loss level; the amplifying fiber can be pumped by commercially available and most widely used in the fiber optics single-mode and multimode diode lasers, including those operating at the 980 nm wavelength.

The object of the invention can be accomplished by providing an amplifying optical fiber operating at a wavelength in the range of 1000-1700 nm, comprising an oxide glass core containing oxides of elements selected from the group consisting of silicon, germanium, phosphorus, aluminum, gallium, and providing optical amplification, and at least one oxide glass cladding, the optical fiber characterized in that the core contains oxides of elements selected from the group consisting of silicon, germanium, phosphorus, bismuth, aluminum, gallium at concentration of bismuth oxide of $10^{-4}$-5 mol %, concentration of silicon and germanium, taken together or separately, of 70-99.8999 mol %, concentration of aluminum and gallium oxides, taken together or separately, of 0.1-20 mol %, concentration of phosphorus oxide of 0-10 mol %, and provides a maximum optical gain at least 10 times greater that the nonresonant loss factor in the optical fiber; the outside oxide glass cladding comprises fused silica; wherein the optical fiber core emits luminescence in the range of 1000-1700 nm when excited by light with wavelengths in the range of 750-1200 nm, the half-height width of the luminescence band being more than 120 nm, luminescence band boundaries are defined as points in which the luminescence intensity drops twice relative to the intensity in the luminescence band maximum and are within the spectral range of 1000-1700 nm, the core has an absorption band in the 1000 nm region, pumping to which region provides an increased power conversion of pump light into luminescence light in the 1000-1700 nm range as compared to pumping to another absorption bands.

The optical fiber preferably comprises an external protective polymer cladding.

The relative concentration of silicon oxide and germanium oxide preferably varies in the range from 0 to 100%.

The relative concentration of aluminum oxide and gallium oxide preferably varies in the range from 0 to 100%.

Position of an amplification band of the optical fiber is preferably defined by the relation of concentrations of silicon and germanium oxides in the core glass composition, such that increase in the germanium oxide concentration causes the amplification band to shift to a long-wave region.

The refractive index of the external protective polymer cladding is preferably smaller than the refractive index of the outside fused silica cladding to provide propagation of pump light along the optical fiber core and cladding.

The refractive index of the external protective polymer cladding is preferably greater than the refractive index of the outside fused silica cladding to provide propagation of light only along the optical fiber core.

The object of the invention can be accomplished by providing a method for fabricating an amplifying optical fiber operating at a wavelength in 1000-1700 nm range, comprising the steps of: preparing an optical fiber preform by chemical vapor deposition of oxides forming a core and resulting from the reaction between oxygen and vapors of chlorides of elements selected from the group consisting of silicon, germanium, phosphorus, aluminum, gallium, on an inner surface of a fused silica tube serving as a cladding, the deposition method including: passing oxygen and vapors of chlorides of said elements through the fused silica tube at a temperature of 1700-2000° C., and subjecting the tube to subsequent compression under surface tension forces at a temperature of 2000-2100° C. to produce a solid rod-shaped optical fiber preform which is further drawn into an optical fiber, said method characterized in that, simultaneously with said chlorides, vapors of bismuth chloride are passed through the fused silica tube at a partial pressure of 10-35 mm Hg, to this end solid bismuth chloride is heated to a temperature of 70-200° C. and the resulting vapors are fed into the main flow of chlorides of said elements, such that bismuth oxide is formed by the reaction between oxygen and bismuth chloride vapors, thereby doping the core glass with bismuth oxide.

The chemical vapor deposition method is preferably selected from the group consisting of a modified chemical vapor deposition method (MCVD), plasma chemical vapor deposition method (PCVD) and its modification (SPCVD).

According to another aspect of the present invention a method is provided for fabricating an amplifying optical fiber operating at a wavelength in 1000-1700 nm range, comprising the steps of: preparing an optical fiber preform by a modified chemical vapor deposition of oxides forming a core and resulting from the reaction between oxygen and vapors of chlorides of elements selected from the group consisting of silicon, germanium, phosphorus, aluminum, gallium on an inner surface of a fused silica tube serving as a cladding, the deposition method including: passing oxygen and vapors of chlorides of said elements through the fused silica tube at a temperature of 1700-2000° C. to produce on an inner surface of the tube a porous glass layer forming the core, the method characterized in that a solution of bismuth nitrate in a concentrated nitric acid (50-90% $HNO_3$) at a concentration of bismuth nitrate in the solution of 0.01-0.5 mole/l is poured into the tube and held there for a period of 1 to 3 hours; the solvent—nitric acid and water—is dried out at a room temperature in a flow of oxygen and nitrogen; the tube is heated in a flow of oxygen, nitrogen and chlorine-containing agents to a temperature of 1700-2000° C. to convert the porous glass layer into a solid layer; the tube is subjected to subsequent compression under surface tension forces at a temperature of 2000-2100° C. to produce a solid rod-shaped optical fiber preform which is then drawn into an optical fiber.

According to further aspect of the present invention a method is provided for fabricating an amplifying optical fiber operating at a wavelength in 1000-1700 nm range, comprising the steps of: preparing an optical fiber preform by an outside chemical vapor deposition method including: forming a preform core by deposition, from gaseous phase, of oxides resulting from the reaction between oxygen and chloride vapors of elements selected from the group consisting of silicon, germanium, phosphorus, aluminum, gallium on a surface of a ceramic rod at a temperature of 1300-1500° C. in the form of finely dispersed particles forming porous glass; forming cladding layers by reducing concentrations of the supplied chlorides of said elements, while maintaining the silicon chloride concentration; cooling the optical fiber preform to a room temperature and removing the preform from the ceramic rod; heating the preform in an atmosphere of oxygen, helium and chlorine-containing agents to a temperature of 1400-1600° C. to convert the porous glass into solid glass, and drawing the preform into an optical fiber, said method characterized in that, when forming a preform core, the optical fiber core is doped with bismuth oxide, to this end solid bismuth oxide is heated to a temperature of 70-200° C. and the resulting bismuth chloride vapors are fed at a partial pressure of 10-35 mm Hg into the main flow of chlorides of said elements, such that bismuth oxide is formed by the reaction between oxygen and bismuth chloride vapors and deposited together with oxides of said elements.

According to a further aspect of the present invention a method is provided for fabricating an amplifying optical fiber operating at a wavelength in 1000-1700 nm range, comprising the steps of: preparing an optical fiber preform by an outside chemical vapor deposition including: forming a preform core by vapor deposition of oxides resulting from the reaction between oxygen and chloride vapors of elements selected from the group consisting of silicon, germanium, phosphorus, aluminum, gallium on a surface of a ceramic rod at a temperature of 1300-1500° C. in the form of finely dispersed particles forming porous glass; forming cladding layers by reducing concentrations of introduced chlorides of said elements, while maintaining the concentration of silicon chloride; cooling the optical fiber preform to a room temperature and removing the preform from the ceramic rod; heating the preform in an atmosphere of oxygen, helium and chlorine-containing agents to a temperature of 1400-1600° C. to convert the porous glass to solid glass, and drawing the preform into an optical fiber, said method characterized in that, after forming the core, the rod together with the porous glass core is cooled to a room temperature and immersed into a solution of bismuth nitrate in a concentrated nitric acid (50-90% $HNO_3$) at a concentration of bismuth nitrate in the solution of 0.01-0.5 mole/l and held there for a period of 1 to 3 hours; the solvent, nitric acid and water, is dried out at a room temperature in a flow of oxygen and nitrogen, and then a cladding is formed.

According to another aspect of the present invention a method is provided for fabricating an amplifying optical fiber operating at a wavelength in 1000-1700 nm range, comprising the steps of: preparing an optical fiber preform by a vapor-phase axial deposition method including: forming a rod-shaped core and cladding by deposition, from gaseous phase, of oxides formed in a flame of a coaxial burner by the reaction between oxygen and chloride vapors of elements selected from the group consisting of silicon, germanium, phosphorus, aluminum, gallium, on an end face of the growing preform at 1300-1500° C. in the form of finely dispersed particles forming porous glass; the refractive index profile being set by adjusting a spatial distribution of concentrations of said chlorides fed into the flame of the coaxial burner; heating the porous glass rod in an atmosphere of oxygen, helium and chlorine-containing agents to a temperature of 1400-1600° C. to convert the porous glass into solid glass and produce the preform which is then drawn into an optical fiber, said method characterized in that, when preparing a preform, a core is doped with bismuth oxide, to this end solid bismuth oxide is heated to 70-200° C. and the resulting bismuth chloride vapors are fed at a partial pressure of 10-35 mm Hg into the main flow of chlorides of said elements in the coaxial burner central part, such that bismuth oxide is formed by the reaction between oxygen and bismuth chloride vapors and deposited together with oxides of said elements.

According to further aspect of the present invention a method is provided for fabricating an amplifying optical fiber operating at a wavelength in 1000-1700 nm range, comprising the steps of: preparing an optical fiber preform by a vapor-phase axial deposition method including: forming a rod-shaped core by deposition, from gaseous phase, of oxides formed in a flame of a coaxial burner by the reaction between oxygen and chloride vapors of elements selected from the group consisting of silicon, germanium, phosphorus, aluminum, gallium, on an end face of the growing preform at a temperature of 1300-1500° C. in the form of finely dispersed particles forming porous glass; the method characterized in that, after forming a porous glass core, the core is cooled to a room temperature and immersed into a solution of bismuth nitrate in a concentrated nitric acid (50-90% $HNO_3$) at a concentration of bismuth nitrate in the solution of 0.01-0.5 mole/l and held there for a period of 1 to 3 hours; the solvent, nitric acid and water, is dried out at a room temperature in a flow of oxygen and nitrogen; the porous glass core is heated in an atmosphere of oxygen, helium and chlorine-containing agents to a temperature of 1400-1600° C. to convert the porous glass rod into a solid glass rod; a cladding is formed to produce a preform which is further drawn into an optical fiber.

The cladding is preferably formed by an outside vapor deposition method including: depositing, from gaseous phase, silicon oxide formed by the reaction between oxygen and silicon chloride vapors, on a surface of the core rod at a temperature of 1300-1500° C. in the form of finely dispersed particles forming a porous glass; heating the porous glass in an atmosphere of oxygen, helium and chlorine-containing agents to a temperature of 1400-1600° C. to convert the porous glass into solid glass.

The cladding is advantageously formed by introducing the core rod into a cavity of a quartz tube and subjecting the tube to subsequent compression under surface tension forces at a temperature of 2000-2100° C. to produce a solid rod-shaped optical fiber preform.

The object of the present invention can be accomplished in a fiber laser for generating light at a wavelength in the range of 1000-1700 nm, the laser comprising: at least one amplifying optical fiber for amplifying the laser light; an optical pump source; a device for introducing a pump light into said optical fiber; a light resonator for providing multiple passage of the laser generated light along said optical fiber; a device for outputting the generated light from the resonator, wherein according to the invention the amplifying optical fiber is a optical fiber fabricated according to any one of claims 1 to 7.

Wavelengths of the pump light are preferably within the range of 750-1200 nm.

Wavelengths of the pump light that provide a maximum generation efficiency are preferably within the range of 850-1100 nm.

The fiber laser preferably comprises at least one Bragg grating written on a core of an optical fiber according to any one of claims 1 to 7.

BRIEF DESCRIPTION OF THE DRAWINGS

A more complete appreciation of the present invention will be readily obtained by reference to the following detailed description of a preferred embodiment thereof when considered in connection with the accompanying drawings, wherein.

DETAILED DESCRIPTION OF THE PREFERRED EMBODIMENTS

An amplifying optical fiber operating at a wavelength in 1000-1700 nm range comprises an oxide glass core to provide amplification and at least one oxide glass cladding.

The core contains oxides of elements selected from the group consisting of silicon, germanium, bismuth, aluminum, gallium, wherein concentration of bismuth is $1^{-4}$-5 mol % at concentration of silicon and germanium, taken together or separately, of 70-99.8999 mol %, concentration of aluminum and gallium oxides, taken together or separately, of 0.1-20 mol %, and the core provides a maximum gain at least 10 times greater than the nonresonant loss factor in the optical fiber, thereby providing efficient amplification.

The cladding of the oxide glass optical fiber consists of fused silica which permits connection of the optical fiber with fused silica fibers by splicing at low optical insertion loss level.

The core of the optical fiber, as compared to some another glasses, has an absorption band in the 1000 nm region. Pumping to this region provides the most efficient energy conversion of pump light into luminescence light in the 1000-1700 nm range as compared to pumping to another absorption bands. This is provided by both lower quantum loss and the smallest absorption from excited states as compared to pumping to absorption bands which are located in a more short-wave part of the spectrum. Furthermore, excitation is possible at 980 nm wavelength that corresponds to the most common diode pumping for ytterbium and erbium-ytterbium lasers in fiber optics.

The optical fiber emits luminescence in 1000-1700 nm region when excited by a light with wavelengths in the range of 750-1200 nm, the half-height width of the luminescence band being more than 120 nm, and luminescence band boundaries defined as points in which luminescence intensity drops twice relative to the intensity in the luminescence band maximum lie within the spectral range of 1000-1700 nm.

Table below lists concentrations of oxides of silicon, germanium, aluminum, gallium and bismuth in cores of some studied amplifying optical fibers that possess the best maximum gain/optical loss ratio.

Figure 1:
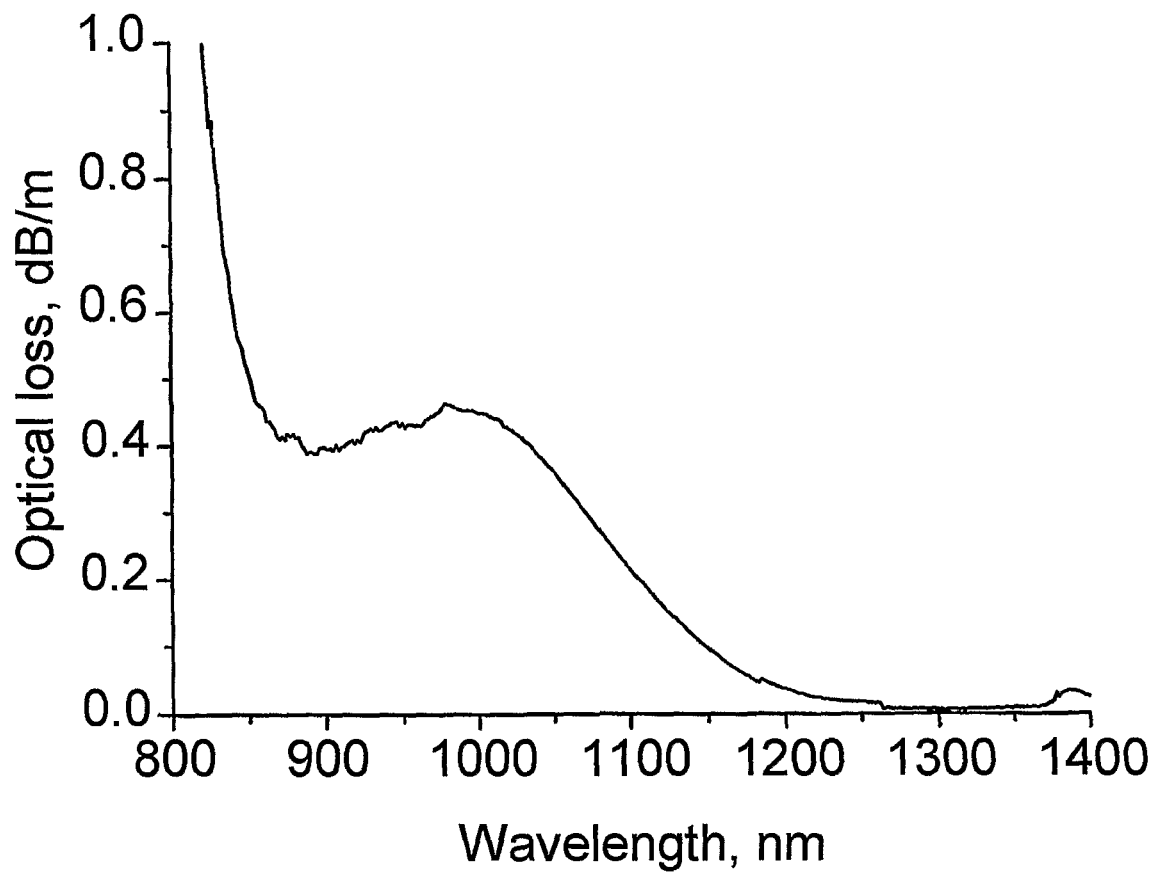
FIG. 1 shows an optical loss spectrum of a bismuth-doped optical fiber having a core that also contains $Al_2O_3$ and $SiO_2$ according to the invention.

FIG. 1 shows a typical loss spectrum. An optical fiber comprises a fused quartz cladding and a core containing silicon oxide, aluminum oxide and bismuth oxide. Active loss level at the 1000 nm wavelength is about 50 times greater than the optical loss level in the 1.3 µm region, where the absorption band intensity has become negligible by this time.

Figure 2:
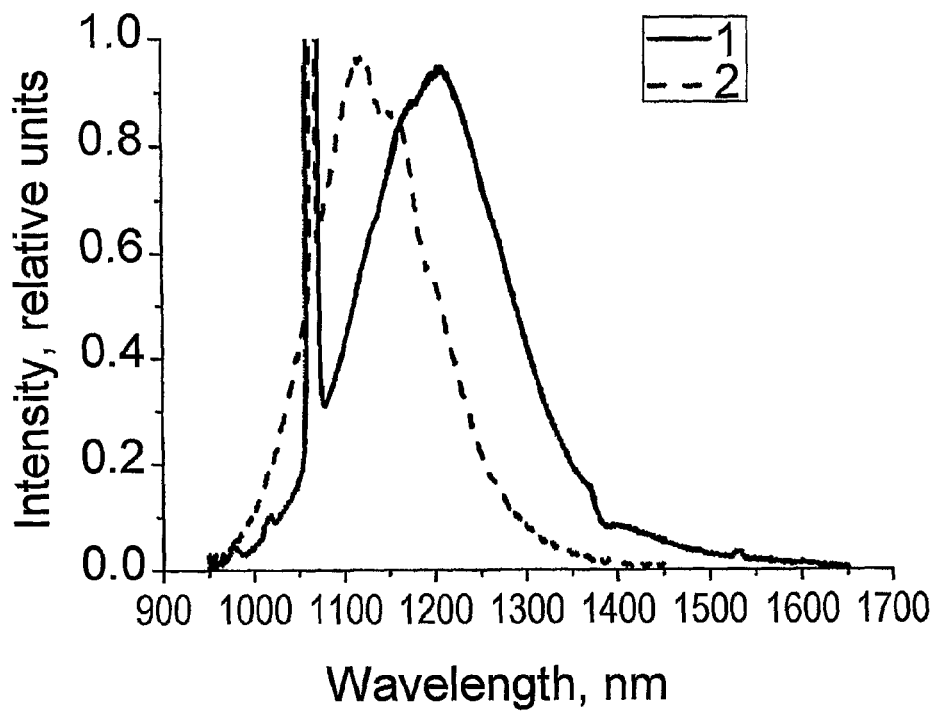
FIG. 2 shows luminescence spectra in bismuth-doped fibers having a core that also contains $Bi_2O_3$, $Al_2O_3$, $GeO_2$, $P_2O_5$, $SiO_2$ (curve 1), and $Bi_2O_3$, $Al_2O_3$, $SiO_2$ (curve 2); peak in the 1064 nm region is caused by Nd:YAG laser light used to excite luminescence, according to the invention.

FIG. 2 shows typical luminescence spectra. Curve 1 corresponds to the described optical fiber having a core that contains silicon oxide, aluminum oxide and bismuth oxide. Curve 2 corresponds to an optical fiber having a core consisting of silicon oxide, aluminum oxide, germanium oxide, phosphorus oxide and bismuth oxide, and formed at excitation with the wavelength of 1064 nm by ND:YAG laser. In the optical fiber with the core lacking germanium oxide the luminescence band has maximum in the 1120 nm region and 150 nm width, while in the optical fiber with the core containing germanium oxide the luminescence band has maximum in the 1205 nm region and 180 nm width.

By way of example, the maximum gain at the 1150 nm wavelength for a fabricated optical fiber (at the maximum luminescence cross section of $6 \times 10^{-21}$ $cm^{-2}$ obtained at the 1150 wavelength) having a core that consists of silicon oxide, aluminum oxide and bismuth oxide was 0.7 dB/m, while the nonresonant loss was more than 70 times smaller.

Amplification of a signal in the optical fiber was demonstrated at pumping at the 1064 nm wavelength by Nd:YAG laser. The signal source was a Bragg grating with a high reflection factor (greater than 20 dB) at the 1215 wavelength, the grating was written on a germanium-silicate fiber and spliced to one of the end faces of the active fiber. Pumping was accomplished to the core of the free end face of the germanium-silicate fiber comprising Bragg grating by focusing laser light with the aid of a lens onto the fiber end face. Signal was outputted through the free end face of the active fiber. In this case, after passing by the signal reflected from the grating through active fiber, amplification of 9 dB was registered. The gain exceeded more than 20 times the nonresonant loss level in the fiber. The gain was in agreement with theoretic forecasts and differed from the maximum possible one due to insufficient pump power and excessive length of the fiber, as well as owing to the fact that the pump light stroke the fiber amplification band.

A preferred embodiment of the optical fiber comprises an external protective polymer cladding.

In the invented optical fiber, concentration of silicon oxide relative to concentration of germanium oxide varies from 0 to 100%, while concentration of germanium varies from 100% to 0 relative to silicon oxide concentration.

Concentration of aluminum oxide varies from 0 to 100% relative to concentration of gallium oxide, while concentration of gallium oxide varies from 0 to 100% relative to concentration of aluminum oxide.

A position of an amplification band of the optical fiber is defined by the relation of silicon oxide and germanium oxide concentrations, such that increase in the germanium oxide concentration makes the amplification band to shift to a long-wave region. By changing the concentration ratio of glass components the amplification band maximum can be shifted at the 1064 nm pumping to the 1300 nm region in an optical fiber with a core containing silicon oxide, aluminum oxide, germanium oxide and bismuth oxide.

FIG. 2 shows luminescence spectra of an optical fiber with a core consisting of silicon oxide, aluminum oxide and bismuth oxide, and an optical fiber with a core consisting of silicon oxide, aluminum oxide, germanium oxide, phosphorus oxide and bismuth oxide. Addition of germanium oxide provides shift of the luminescence band maximum to a more long-wave region.

The refractive index of the external protective polymer cladding is smaller that that of the outside fused silica cladding to provide propagation of pump light along the optical fiber core and cladding. This allows pumping of the fiber along the cladding and employment of high power multimode diode lasers for pumping.

In another embodiment the refractive index of the external protective polymer cladding is greater than that of the outside fused silica cladding to provide propagation of light only along the optical fiber core when it is required to output spurious radiation propagating along the cladding from the fiber.

A method of fabricating an amplifying optical fiber operating at a wavelength in 1000-1700 nm range is accomplished as follows.

An optical fiber preform is prepared by a chemical vapor deposition of oxides forming a core and resulting from the reaction between oxygen and vapors of chlorides of elements selected from the group consisting of silicon, germanium, phosphorus, aluminum, gallium, on an inner surface of a fused silica tube serving as a cladding, the deposition method including: passing oxygen and vapors of chlorides of the aforementioned elements through the quartz tube at a temperature of 1700-2000° C., and subjecting the tube to subsequent compression under the surface tension forces at a temperature of 2000-2100° C. to produce a solid rod-shaped optical fiber preform which is then drawn into an optical fiber.

In addition, vapors of bismuth chloride are passed simultaneously with the listed chlorides through the fused silica tube at a partial pressure of 10-35 mm Hg, to this end solid bismuth chloride is heated to a temperature of 70-200° C., and the resulting vapors are fed into the main flow of chlorides of the aforementioned elements, such that bismuth oxide is formed by the reaction between oxygen and bismuth chloride vapors, thereby doping the core glass with bismuth oxide.

The chemical vapor deposition method is a method selected from the group consisting of a modified chemical vapor deposition (MCVD), a plasma chemical vapor deposition method (PCVD) and its modification (SPCVD).

The Table lists concentrations of oxides of silicon, germanium, aluminum, gallium and bismuth in cores of some investigated amplifying optical fibers. In particular, optical fibers 4, 7, 11, 14 were fabricated by MCVD method, optical fiber 10 was fabricated by PCVD method and optical fiber 5 was produced by SPCVD method.

An embodiment of a method for fabricating an amplifying optical fiber operating at a wavelength in 1000-1700 nm range can be accomplished as follows.

An optical fiber preform is prepared by a modified chemical vapor deposition of oxides forming a core and resulting from the reaction between oxygen and vapors of chlorides of elements selected from the group consisting of silicon, germanium, phosphorus, aluminum, gallium, on an inner surface of a fused silica tube serving as a cladding, the deposition method including: passing oxygen and vapors of chlorides of the listed elements through the tube at a temperature of 1700-2000° C. to produce on the inner surface of the tube a porous glass layer forming the core.

A solution of bismuth nitrate in a concentrated nitric acid (50-90% $HNO_3$) at a bismuth nitrate concentration in the solution of 0.01-0.5 mole/l is poured into the tube and held there for a period of 1 to 3 hours. The solvent—nitric acid and water—is dried out at a room temperature in a flow of oxygen and nitrogen.

The tube is heated to a temperature of 1700-2000° C. in a flow of oxygen, nitrogen and chlorine-containing agents to convert the porous glass layer into a solid layer. The tube is then subjected to compression under surface tension forces at a temperature of 2000-2100° C. to produce a solid rod-shaped optical fiber preform which is then drawn into an optical fiber.

The Table lists concentrations of oxides of silicon, germanium, aluminum, gallium and bismuth in cores of some investigated amplifying optical fibers. In particular, optical fibers 2, 8, 15 were prepared by MCVD method, wherein bismuth oxide was doped into the core by the method of impregnating the porous glass layer with bismuth nitrate solution.

Another embodiment of the method of fabricating an amplifying optical fiber operating at a wavelength in 1000-1700 nm range can be accomplished as follows.

An optical fiber preform is prepared by an outside vapor deposition method including: forming a preform core by deposition, from gaseous phase, of oxides resulting from the reaction between oxygen and vapors of chlorides of elements selected from the group consisting of silicon, germanium, phosphorus, aluminum, gallium, on a surface of a ceramic rod at a temperature of 1300-1500° C. in the form of finely dispersed particles forming porous glass.

Then layers of cladding are formed by reducing concentrations of the supplied chlorides of aforementioned elements, while maintaining the concentration of silicon chloride.

The optical fiber preform is cooled to a room temperature and removed from the ceramic rod. The preform is heated in an atmosphere of oxygen, helium and chlorine-containing agents to a temperature of 1400-1600° C. to convert the porous glass into solid glass, and the preform is drawn into an optical fiber.

When forming a preform core it is doped with bismuth oxide, to this end solid bismuth chloride is heated to a temperature of 70-200° C., the resulting bismuth chloride vapors are fed at a partial pressure of 10-35 mm Hg into the main flow of chlorides of aforementioned elements, such that bismuth oxide is formed by the reaction between oxygen and bismuth chloride vapors and deposited together with oxides of the listed elements.

The Table lists concentrations of oxides of silicon, germanium, aluminum, gallium and bismuth in cores of some investigated amplifying optical fibers. In particular, optical fiber 13 was fabricated by the aforementioned outside vapor deposition (OVD).

Another embodiment of a method for fabricating an amplifying optical fiber operating at a wavelength in 1000-1700 nm range can be accomplished as follows.

An optical fiber preform is prepared by an outside vapor deposition including: forming a preform core by deposition, from gaseous phase, of oxides generated by the reaction between oxygen and vapors of chlorides of elements selected from the group consisting of silicon, germanium, phosphorus, aluminum, gallium on a surface of a ceramic rod at a temperature of 1300-1500° C. in the form of finely dispersed particles forming porous glass.

Cladding layers are formed by reducing concentrations of the supplied chlorides of the aforementioned elements, while maintaining the silicon chloride concentration. The optical fiber preform is cooled to a room temperature and removed from the ceramic rod.

The preform is heated in an atmosphere of oxygen, helium and chlorine-containing agents to a temperature of 1400-1600° C. to convert the porous glass into solid glass, and the preform is drawn into an optical fiber.

After forming the core, the rod together with the porous glass core is cooled to a room temperature and immersed into a solution of bismuth nitrate in a concentrated nitric acid (50-90% $HNO_3$) at a concentration of bismuth nitrate in the solution of 0.01-0.5 mole/l, and held there for a period of 1 to 3 hours. Then the solvent—nitric acid and water—is dried out at a room temperature in a flow of oxygen and nitrogen, and a cladding is formed.

The Table lists concentrations of oxides of silicon, germanium, aluminum, gallium and bismuth in cores of some investigated amplifying optical fibers. In particular, optical fiber 1 was manufactured by the outside vapor deposition method (OVD), wherein bismuth oxide was introduced into the core using the aforementioned method of impregnating a porous glass layer with a solution containing bismuth nitrate.

Another embodiment of a method for fabricating an amplifying optical fiber operating at a wavelength of 1000-1700 nm can be accomplished as follows.

An optical fiber preform is prepared by a vapor-phase axial deposition method, including: forming a rod-shaped core and cladding by deposition, from gaseous phase, of oxides formed in a flame of a coaxial burner by the reaction between oxygen and chloride vapors of elements selected from the group consisting of silicon, germanium, phosphorus, aluminum, gallium on an end face of the growing preform at a temperature of 1300-1500° C. in the form of finely dispersed particles forming the porous glass.

The refractive index profile is set by adjusting a spatial distribution of concentrations of the listed chlorides fed into the coaxial burner flame. The porous glass rod is heated in an atmosphere of oxygen, helium and chlorine-containing agents to a temperature of 1400-1600° C. to convert the porous glass into solid glass and produce a preform which is then drawn into an optical fiber.

When preparing a preform, a core is doped with bismuth oxide, to this end solid bismuth oxide is heated to a temperature of 70-200° C. and the resulting bismuth chloride vapors are fed at a partial pressure of 10-35 mm Hg into the main flow of chlorides of said elements in the central part of the coaxial burner, such that bismuth oxide is formed by the reaction between oxygen and bismuth chloride vapors and deposited together with oxides of said elements.

The Table lists concentrations of oxides of silicon, germanium, aluminum, gallium and bismuth in cores of some investigated amplifying optical fibers. In particular, optical fibers 9, 12 were manufactured by a vapor-phase axial deposition method (VAD).

Another embodiment of a method of fabricating an amplifying optical fiber operating at a wavelength of 1000-1700 nm can be accomplished as follows.

An optical fiber preform is prepared by a vapor-phase axial deposition method including: forming a rod-shaped core by deposition, from gaseous phase, of oxides formed in a flame of a coaxial burner by the reaction between oxygen and vapors of chlorides of elements selected from the group consisting of silicon, germanium, phosphorus, aluminum, gallium, on an end face of the growing preform at a temperature of 1300-1500° C. in the form of finely dispersed particles forming porous glass.

After forming a porous glass core, the core is cooled to a room temperature and immersed into a solution of bismuth nitrate in a concentrated nitric acid (50-90% $HNO_3$) at a concentration of bismuth nitrate in the solution of 0.01-0.5 mole/l and held there for a period of 1 to 3 hours.

The solvent—nitric acid and water—is dried out at a room temperature in a flow of oxygen and nitrogen, the porous glass core is heated in an atmosphere of oxygen, helium and chlorine-containing agents to a temperature of 1400-1600° C. to convert the porous glass rod into a solid glass rod. A cladding is formed to produce a preform which is then drawn into an optical fiber.

In one embodiment, the cladding is formed by an outside vapor deposition method including: depositing, from gaseous phase, silicon oxide formed by the reaction between oxygen and silicon chloride vapors on a surface of the core rod at a temperature of 1300-1500° C. in the form of finely dispersed particles forming the porous glass; heating the porous glass in an atmosphere of oxygen, helium and chlorine-containing agents to a temperature of 1400-1600° C. to convert the porous glass into solid glass.

In another embodiment, a cladding is formed by introducing the core rod into a cavity of a quartz tube and subjecting the tube to compression under surface tension forces at a temperature of 2000-2100° C. to produce a solid rod-shaped optical fiber preform.

The Table lists concentrations of oxides of silicon, germanium, aluminum, gallium and bismuth in cores of some investigated amplifying optical fibers. In particular, optical fiber 3 was manufactured by a vapor axial deposition method (VAD), wherein bismuth oxide was introduced into the core using the aforementioned method of impregnating the porous glass layer with a bismuth nitrate solution.

A fiber laser for generating light at a wavelength in the range of 1000 to 1700 nm comprises at least one optical fiber 1 for amplifying the laser light, an optical pump source 2, a device 3 for introducing pump light into the optical fiber, a light resonator 4 for providing multiple passage of the laser generated light along the optical fiber, and a device 5 for outputting the generated light from the resonator.

According to the invention the amplifying optical fiber used in the laser is an optical fiber described above.

EXAMPLE 1

Figure 3:
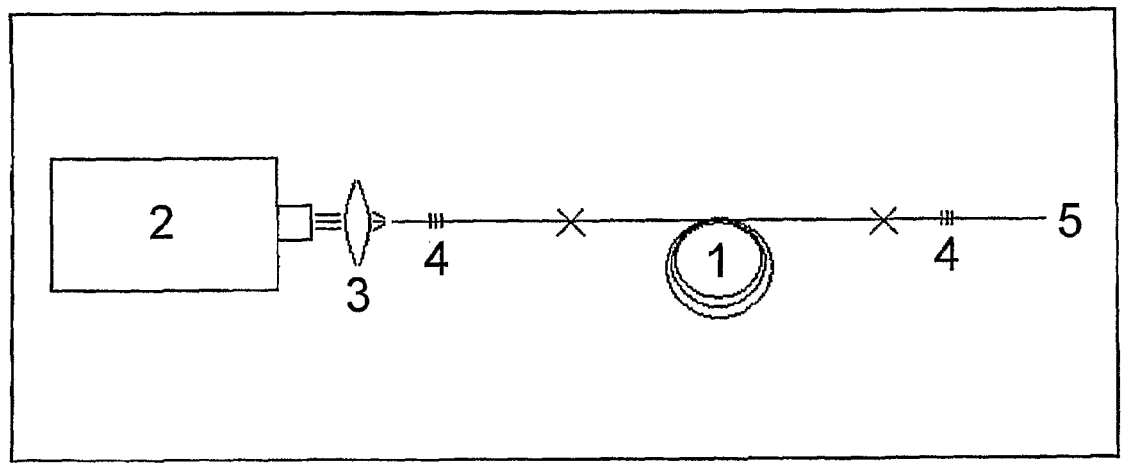
FIG. 3 shows a schematic diagram of a laser in which Bragg gratings are used to form a resonator, according to the invention.

Lasing was demonstrated using an optical fiber with a core consisting of silicon oxide, aluminum oxide and bismuth oxide at wavelengths of 1150, 1215, 1250 and 1300 nm with pumping at the 1064 nm wavelength. Bragg gratings were used to form a resonator (FIG. 3). The gratings were written on standard germanium-silicate fibers, wherein output gratings had the reflection factor of 3 dB and mating gratings had a high reflection factor greater than 20 dB.

The maximum output power obtained at a pump power of about 2.5 W was 460 mW at the wavelength 1150 nm and 400 mW at the wavelength 1215 nm.

In case of lasing at 1150 nm the lasing threshold was 210 mW, while the differential efficiency was 20.4% on the input power basis. In case of lasing at 1215 nm the threshold was 495 mW with the differential efficiency of 28.6%. These values are in a good agreement with theoretical data and may be considerably improved in practice by:

a) using the optical fibers with written gratings whose parameters coincide with that of active fibers. This will reduce losses at spliced sections, which were 2 dB per a resonator trip in this Example and resulted from different diameters of mode spots of the optical amplifying fiber and the fibers comprising Bragg gratings;

b) reducing the active fiber excessive length because the excessive length raises the resonator loss, primarily due to the partially three-level character of laser medium, i.e. due to absorption of generated light by the insufficiently pumped section of the optical fiber, and to a lesser extent due to increased passive losses.

Spectroscopic studies did not allow determination of causes that significantly restricted lasing efficiency by reason of low absorption from excited states with pumping to a band having maximum in 1000 nm region.

EXAMPLE 2

Figure 4:
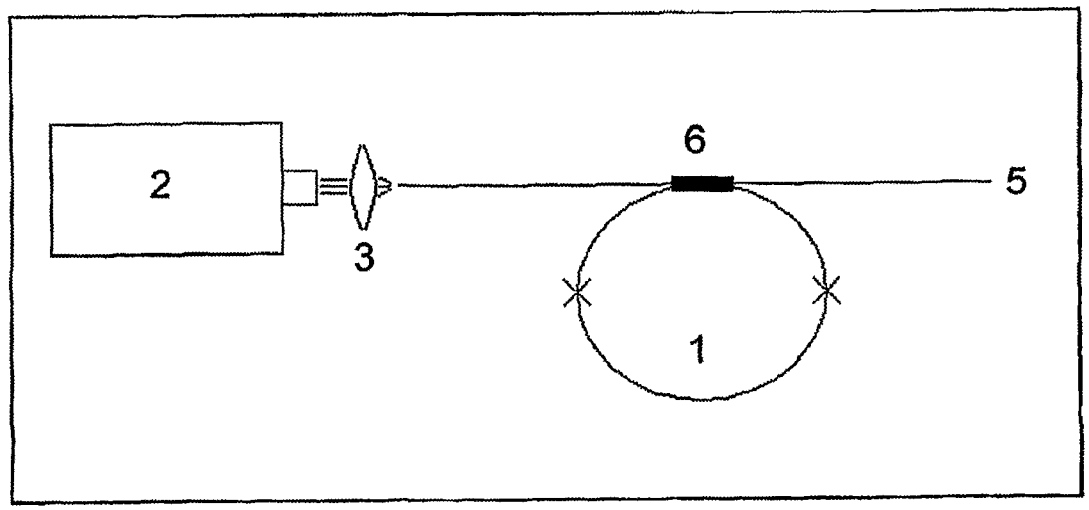
FIG. 4 shows a schematic diagram of a laser in which an optical fiber coupler is used to form a resonator, according to the invention.
Figure 5A:
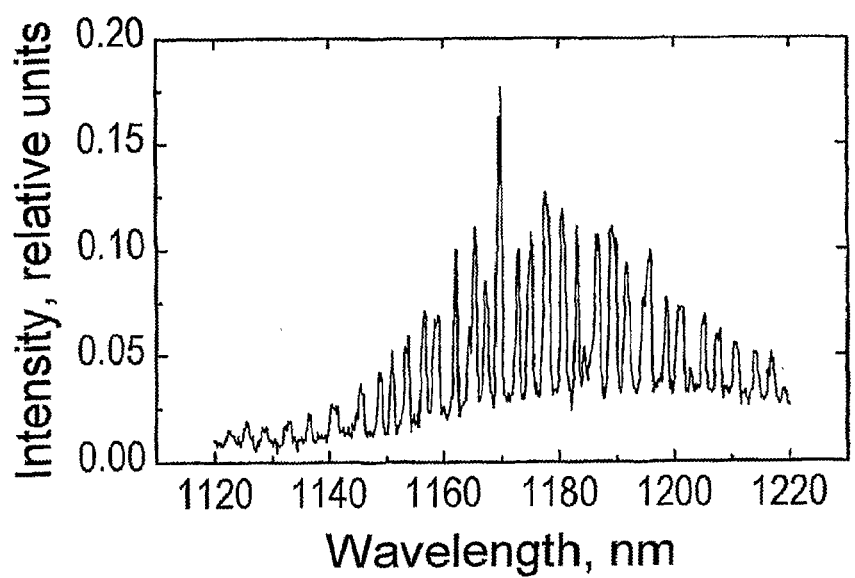
FIG. 5 shows lasing spectra for a laser having an optical fiber coupler-based resonator, wherein the active fiber has a fused quartz cladding and a core containing $Bi_2O_3$, $Al_2O_3$, $SiO_2$, according to the invention.
Figure 5B:
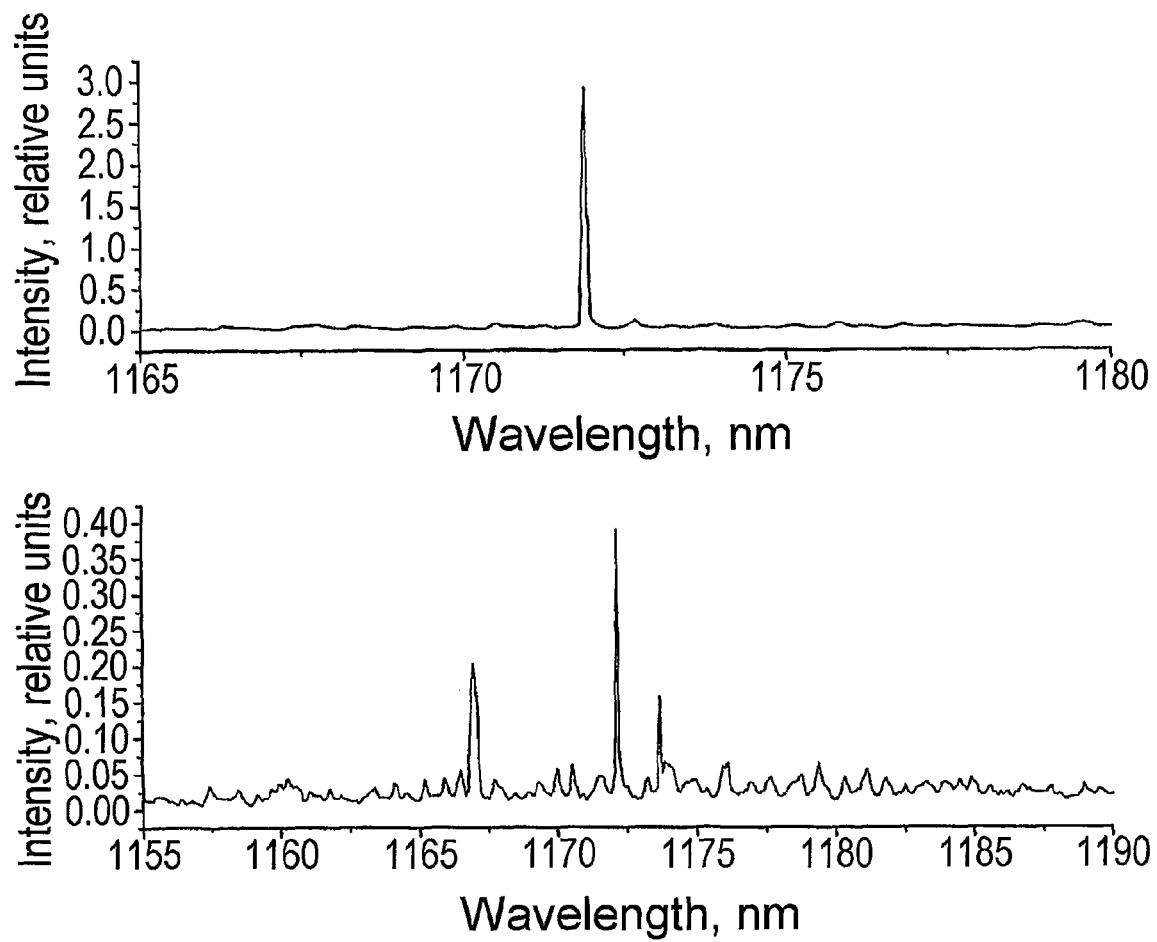

Lasing was investigated in the range of 1120-1220 nm in a laser circuit (FIG. 4) with an optical fiber coupler 6 used to form a resonator. The coupler 6 was made on the basis of a standard germanium-silicate fiber. The resulting resonator had a high reflection factor (greater than 80%) in the 1.1-1.2 nm band. The active fiber had a fused quartz cladding and a core consisting of $SiO_2$, $Al_2O_3$, $Bi_2O_3$. FIGS. 5a and 5b show lasing spectra obtained in the laser with pumping at 1064 nm. Owing to small selectivity of the resonator, when the lasing threshold was slightly exceeded the lasing occurred at once at a plurality of longitudinal modes, while the spectral position of peaks is unstable, i.e. "free lasing" regime was realized. With increasing the pump power the number of peaks decreased, but actually one maximum remained in the 1170 nm region when the threshold was considerably exceeded (FIG. 5b).

As shown in FIG. 5a, the free regime lasing occurred in a band with about 100 nm width, which could be used to tune the lasing wavelength by adding the components providing spectral mode selection to the circuit. In this case the band width can be widened by reducing the parasitic loss level in the resonator and optimizing the laser circuit.

Pump light wavelengths are within the range from 750 to 1200 nm, this providing both the smaller quantum losses, and the lower absorption from excited states as compared to pumping to another absorption bands located in a more short-wave part of spectrum.

Pumping light wavelengths that provide the highest lasing efficiency are within the range from 850 to 1100 nm where absorption from excited states is small, while active absorption is more intensive, and overlapping with the amplification band is smaller than in the 1100-1200 nm range.

Figure 3A:
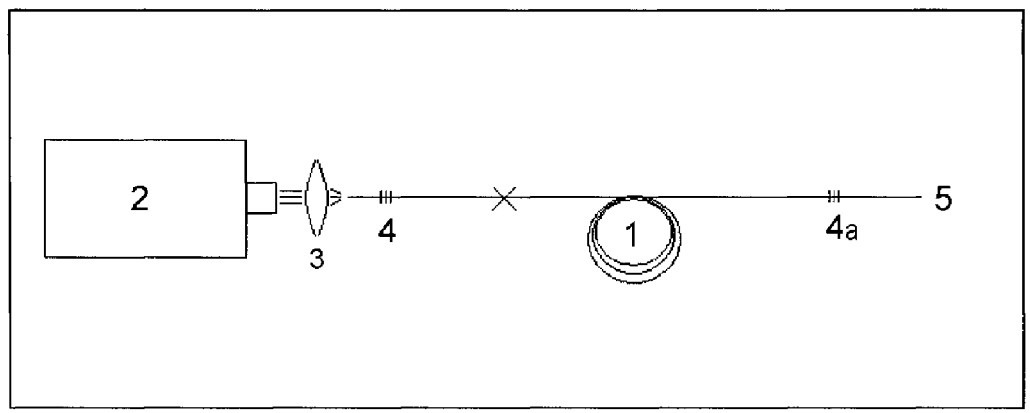
FIG. 3a shows a Bragg grating written on the core of the amplifying optical fiber.
Figure 3B:
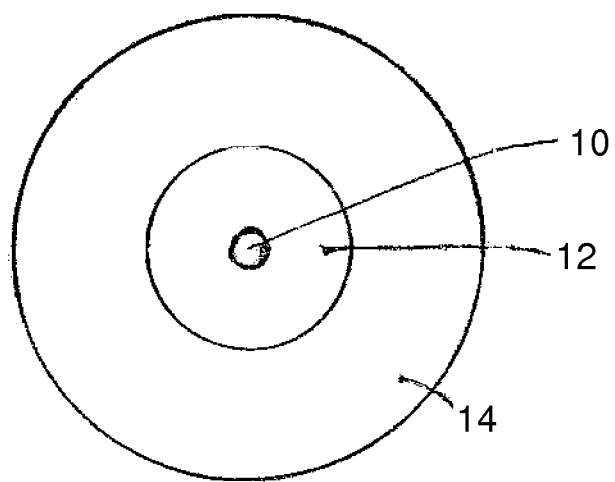
FIG. 3b shows an optical fiber having a core, an oxide glass cladding comprising fused silica and an external protective polymer cladding.

In one embodiment (e.g., FIG. 3a) a fiber laser comprises at least one Bragg grating written on a core of a germanium-doped amplifying optical fiber. As seen in FIG. 3b, the optical fiber comprises an oxide glass core 10 having at least one oxide glass cladding 12 which comprising fused silica, and the optical fiber may further comprise an external protective polymer cladding 14.

As described above, the present invention provides a novel type of an optical fiber suitable for realizing lasers in the range from 1000 to 1700 nm with wavelength tuning that exceeds similar characteristics of existing lasers. Efficient fiber lasers and broadband amplifiers can be provided within the first telecommunication transmission window at 1300 nm and in the ranges of 1000-1200 nm and 1400-1500 nm that have not been practically used by now. Novel tunable and femtosecond fiber lasers can be created in the 1000-1700 nm range. The invention advantageously enables active fibers to be joined with fused silica fibers by splicing them with a low level of optical insertion losses.

TABLE

Concentration of oxides of silicon, germanium, aluminum, gallium, phosphorus and bismuth in cores of some amplifying optical fibers having the best maximum gain/optical loss ratio

| No | $SiO_2$, mol % | $GeO_2$, mol % | $Al_2O_3$, mol % | $Ga_2O_3$, mol % | $P_2O_5$, mol % | $Bi_2O_3$, mol % |
|---|---|---|---|---|---|---|
| 1 | 95 | — | 5 | — | — | 0.0001 |
| 2 | 95 | 3 | 1 | 0.5 | 0.5 | 0.08 |
| 3 | 93.5 | 2 | — | 1.5 | 1 | 0.005 |
| 4 | 93 | 2 | 4 | — | 0.9 | 0.1 |
| 5 | 92 | 1.3 | 5 | 0.3 | — | 0.001 |
| 6 | 89 | 3 | — | 5 | 1.5 | 0.02 |
| 7 | 87.5 | 1.5 | 7 | — | 2 | 2 |
| 8 | 91 | — | 9 | — | — | 0.03 |
| 9 | 88.5 | 9 | 1 | — | 1.5 | 0.002 |
| 10 | 88 | — | 10 | — | — | 0.5 |
| 11 | 86 | 1 | 12 | — | 1 | 0.004 |
| 12 | 80 | 5 | 6 | 1 | 6 | 1.1 |
| 13 | 78 | 20 | 1 | — | 0.9 | 0.1 |
| 14 | — | 98 | 2 | — | — | 0.01 |
| 15 | 46 | 52 | 1 | — | — | 0.6 |

What is claimed is:

1. An amplifying optical fiber operating at a wavelength in the range of 1000-1700 nm, comprising:

an oxide glass core devoid of rare-earth elements and containing oxides of elements selected from the group consisting of silicon, germanium, phosphorus, aluminum, gallium, and providing optical amplification, and at least one oxide glass cladding, said optical fiber characterized in that:

the core contains oxides of elements selected from the group consisting of silicon, germanium, phosphorus, bismuth, aluminum, gallium with a concentration of bismuth oxide of $10^{-4}$-5 mol %, a total concentration of silicon and germanium oxides of 70-99.8999 mol %; a total concentration of aluminum and gallium oxides of 0.1-20 mol % wherein both aluminum oxide and gallium oxide are present and a ratio of aluminum oxide to gallium oxide is at least two, and a concentration of phosphorus oxide of 0-10 mol %, and provides a maximum optical gain at least 10 times greater than a nonresonant loss factor in the optical fiber;

the outside oxide glass cladding comprises fused silica;

wherein the optical fiber core emits luminescence in the range of 1000-1700 nm when excited by a light with wavelengths in the range of 750-1200 nm, the half-height width of the luminescence band being more than 120 nm, luminescence band boundaries are defined as points in which the luminescence intensity drops twice relative to the intensity in the luminescence band maximum and lie within the spectral range of 1000-1700 nm, the core has an absorption band in the 1000 nm region, pumping to which region provides an increased power conversion of pump light into luminescence light in the 1000-1700 nm range as compared to pumping to another absorption bands.

2. The optical fiber according to claim 1, characterized in that the optical fiber comprises an external protective polymer cladding.

3. The optical fiber according to claim 1, characterized in that the relative concentration of silicon oxide and germanium oxide varies in the range from 0 to about 100%.

4. The optical fiber according to claim 1, characterized in that position of an amplification band of the optical fiber is defined by the relation of concentrations of silicon and germanium oxides in the core glass composition, such that increase in the germanium oxide concentration makes the amplification band to shift to a long-wave region.

5. The optical fiber according to claim 2, characterized in that the refractive index of the external protective polymer cladding is smaller than the refractive index of the outside fused silica cladding to provide propagation of pump light along the optical fiber core and cladding.

6. The optical fiber according to claim 2, characterized in that the refractive index of the external protective polymer cladding is greater than the refractive index of the outside fused silica cladding to provide propagation of light only along the optical fiber core.

7. A fiber laser for generating light at a wavelength in the range of 1000-1700 nm, comprising:

at least one amplifying optical fiber for amplifying the laser light; an optical pump source;

a device for introducing pump light into said optical fiber; a light resonator for providing multiple passage of the laser generated light along said optical fiber; a device for outputting the generated light from the resonator, said laser characterized in that:

the amplifying optical fiber is an optical fiber in accordance with claim 1.

8. The fiber laser according to claim 7, characterized in that wavelengths of the pump light are within the range of 750-1200 nm.

9. The fiber laser according to claim 7, characterized in that wavelengths of the pump light are within the range of 850-1100 nm.

10. The fiber laser according to claim 7, characterized in that the fiber laser comprises at least one Bragg grating written on the core of said amplifying optical fiber.

11. The optical fiber according to claim 1, characterized in that the core comprises both silicon oxide and germanium oxide.

12. The optical fiber according to claim 1, characterized in that a ratio of aluminum oxide to gallium oxide is at least five.

13. The optical fiber according to claim 1, characterized in that the core comprises both silicon oxide and germanium oxide, and a ratio of silicon oxide to germanium oxide is at least sixteen.

14. The optical fiber according to claim 1, characterized in that the core further comprises germanium oxide, and an amount of germanium oxide exceeds that of gallium oxide.

15. The optical fiber according to claim 14, characterized in that, in the core, an amount of aluminum oxide exceeds that of both germanium and gallium oxide.

* * * * *